Feb. 8, 1927.
C. MATLOCK
1,617,072
PROCESS AND APPARATUS FOR PRODUCING CARBON BLACK
Original Filed July 21, 1921
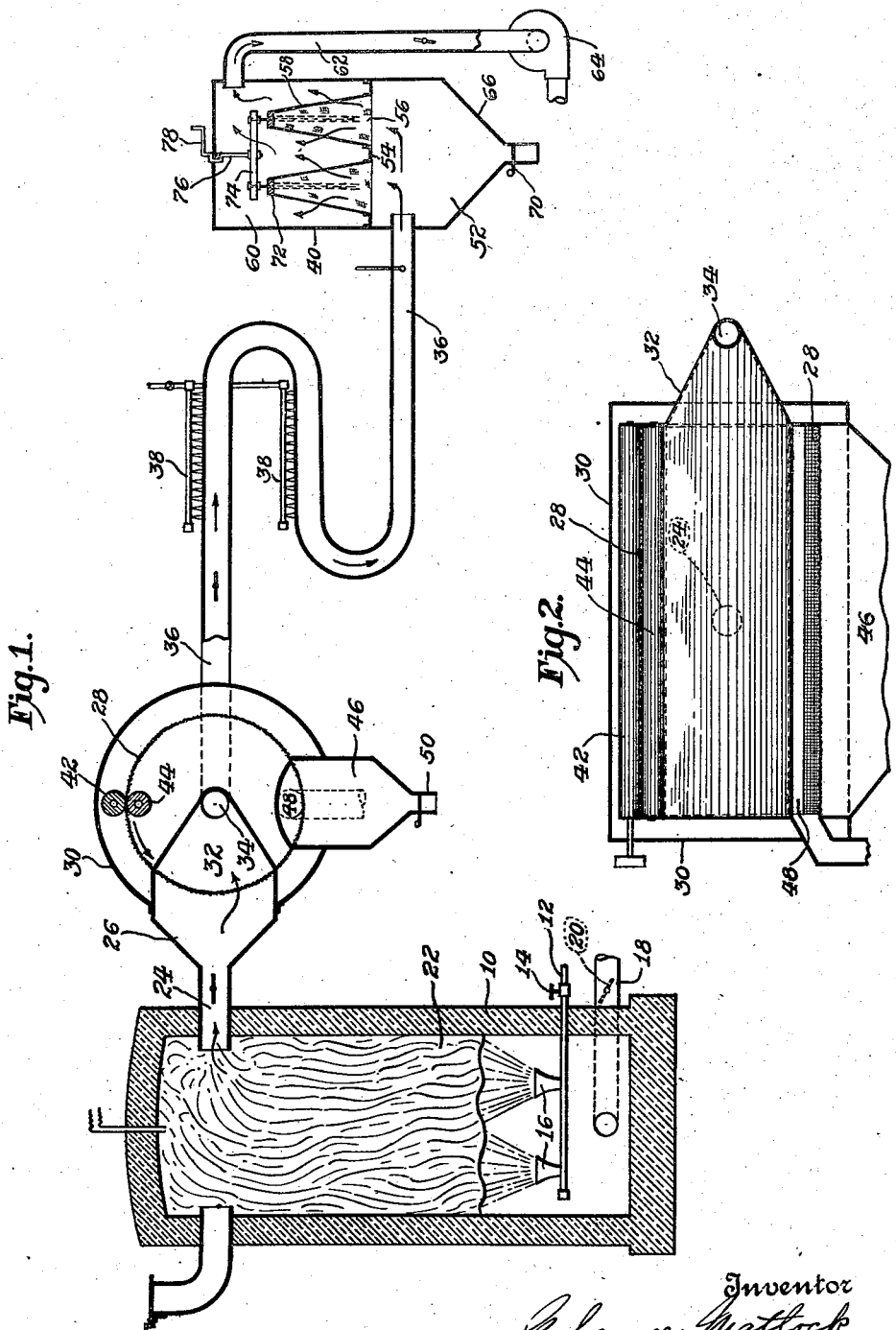
Inventor
Chauncey Matlock
By his Attorney
Chester H. Braselton.

Patented Feb. 8, 1927.

1,617,072

UNITED STATES PATENT OFFICE.

CHAUNCEY MATLOCK, OF BROOKLYN, NEW YORK, ASSIGNOR TO MONROE-LOUISIANA CARBON COMPANY, OF MONROE, LOUISIANA, A CORPORATION OF DELAWARE.

PROCESS AND APPARATUS FOR PRODUCING CARBON BLACK.

Application filed July 21, 1921, Serial No. 486,434. Renewed October 30, 1926.

The present invention relates to a process and apparatus for producing carbon black and more particularly to a process and apparatus for cheaply and efficiently producing carbon black of excellent quality free from oily and tarry products. More specifically the invention relates to an improvement on a process and apparatus for producing carbon black, described in copending application Serial No. 435,068 in which hydrocarbons are partially oxidized to form a suspension of carbon particles in gaseous products of combustion and the carbon is separated from the gaseous products at temperatures above the end boiling points of any tarry or oily products contained in the gaseous products, or above the temperatures at which tarry or oily products are condensed or absorbed in said carbon.

In the above mentioned process the hydrocarbons from which the carbon is to be produced are burned in a closed furnace to which a regulated amount of air is admitted to obtain the desired combustion reaction. The quantity of air supplied and the conditions of combustion are so controlled as to obtain definite temperature conditions in the furnace and to cause a decomposition and a partial combustion of the hydrocarbons and thereby produce a large quantity of free carbon suspended in the gaseous products of combustion. The gases and suspended carbon thereupon pass without excessive cooling directly through a filter suitable for separating the carbon from the gases, the temperature of the filter and of the carbon and gases being maintained above that at which tarry and oily products are condensed or absorbed in the carbon. In filtering the carbon from the gases in the above mentioned process a set of filters arranged in parallel are used, one of which is periodically cut out of the gas circuit and cleaned from the deposited carbon. This periodic change in the filters, however, tends to introduce a periodic variation in the draft and other conditions of operation and a consequent disturbance and interference with the control and adjustment of combustion conditions within the furnace.

An object of the present invention is to provide a process of producing carbon black by which the carbon black may be formed under accurately controlled conditions and the carbon isolated in a continuous manner uncontaminated with oily or tarry products.

Another object of the invention is to provide a process of producing carbon black by which the carbon black may be continuously separated from gases immediately after being formed.

A still further object of the invention is to provide an apparatus by which carbon black may be continuously separated from gaseous reaction products.

A still further object of the invention is to provide an apparatus by which carbon black may be formed and isolated in a uniform manner and by which the conditions of formation and isolation of the carbon may be controlled and irregularities in operation may be avoided.

With these and other objects in view, the invention comprises the process and apparatus described in the following specification and defined in the claims.

The various features of the invention are illustrated in the accompanying drawings, in which:

Fig. 1 is a sectional elevation through an apparatus for carrying on the process, embodying the preferred form of the invention, and, Fig. 2 is a vertical sectional view of the apparatus.

In the present invention, carbon black produced as a fine suspension in the gaseous products formed by the dissociation and partial combustion of hydrocarbons is separated and removed from the gaseous products in a continuous, uniform manner at a sufficiently high temperature to prevent the condensation or deposition in the separated carbon of oily or tarry products formed by the dissociation and partial combustion of the hydrocarbons. To this end, the hydrocarbons are preferably burned in comparatively large flames in an enclosed furnace under such conditions that the temperature, pressure, velocity and other factors affecting combustion may be controlled and the gases protected from cooling and other disturbing influences. On the completion of the desired partial combustion and dissociation of the hydrocarbons, the gases and carbon are immediately removed from the furnace without cooling them sufficiently to cause a condensation of tarry or oily substances resulting from the dissociation and combustion reactions and the carbon is thereupon continuously filtered and removed from contact with the reaction gases. The carbon is continuously removed from the filter in a uniform manner by the use of a continuous filtering device, preferably in the form of a rotating cylindrical screen by which the carbon is continuously filtered from the gases, carried out of contact with the gases and removed from the surface of the screen. Further products may thereupon be recovered from the filtered gases by cooling and re-filtering them.

Referring more particularly to the accompanying drawings, the hydrocarbons to be used for the production of the carbon black are supplied to a furnace, 10, through a supply pipe, 12, and controlling valve, 14, and are distributed in the lower part of the furnace by means of burners, 16. Air for supporting the partial combustion of the hydrocarbons is supplied to the furnace through a supply pipe, 18, and the rate of supply of air is adjusted, by means of a damper, 20, to provide sufficient oxygen to oxidize the hydrogen and sufficient part of the carbon of the hydrocarbons to give the temperature conditions favorable to the production of a maximum of carbon black of the desired quality. The air and hydrocarbons are mixed in the lower part of the furnace and, upon reaching a zone extending upwardly in the furnace from a short distance above the burners, 16, are burned in a substantially uniform manner within a blanket or body of hot burning gases, 22.

The hydrocarbons can not, however, in ordinary practice, be completely dissociated to hydrogen and carbon, or oxidized to water, oxides of carbon and free carbon, a small amount of heavy tarry or oily vapors being formed in the gases through dissociation and recombination of the hydrocarbons. To obtain a carbon black substantially free from these tarry and oily products, the carbon is filtered from the suspending gases while still at a temperature above the end boiling point of the tarry or oily products, or above a temperature at which such products are absorbed by the suspended carbon. The separated carbon is thereupon continuously removed from contact with the gases while above this temperature and may thereafter be cooled entirely out of contact with the gases.

To this end, the gases are withdrawn from the furnace through an outlet pipe, 24, and enter an enlarged portion or chamber, 26, which opens onto and covers a large portion of a rotating cylindrical screen, 28, enclosed within a suitable housing, 30. The edges of the opening of the chamber, 26, fit closely, the surface of the screen, 28, and the gases are therefore drawn from the chamber, 26, through the screen, 28, into a chamber, 32, having walls which meet and contact with or closely approach the inner surface of the screen opposite the walls of the chamber, 26, and form a narrow slot just sufficient to permit the passage of the screen, 26. From the chamber, 32, the gases are withdrawn through an outlet opening, 34, to an exhaust pipe, 36. The filtered gases may be further cooled in the pipe, 36, by means of a spray, 38, and passed to a filtering chamber, 40, in which the products of condensation may be separated and collected.

The carbon separated from the gases on the screen, 28, forms a deposit which becomes thicker and denser as the filtration progresses and accordingly offers an increasing resistance to the further passage of gases. The screen is therefore rotated in the direction shown by the arrow in the drawing, by means of driving rollers, 42, and 43, on opposite surfaces of the screen and the deposited carbon is carried through the slots between the chambers, 26, and 32, into a position above a hopper or receptacle, 46, which extends downwardly through the lower part of the housing, 30.

The carbon may be detached from the screen and collected in the hopper, 46, by any suitable means. In the embodiment of the invention shown in the accompanying drawings, this removal is effected by blowing inert gases from a chamber, 48, within the rotating screen and above the hopper, 26, in a reverse direction to the passage of gases to the screen during the filtering operation. The carbon is thereby detached from the surface of the screen and falls into the hopper from which it may be removed through an outlet pipe, 50. Upon the removal of the carbon, the screen is drawn or rotated by means of the rollers, 42, and 44, into the filtering chamber 26—32, and again serves to separate carbon from the hot combustion gases, from the furnace, 10. By means of this arrangement a constant, steady draught through the entire apparatus is maintained and at the same time, the carbon is continuously removed from the gases in a condition substantially free from oily or tarry products. It will be understood that the form of the chambers 26 and 32 may be changed to occupy a larger surface of the screen and that other forms and types of screen may be employed. The screen, 28, may be formed of any material capable of withstanding the temperatures employed. A Monel metal screen of 300 mesh, for instance, meets the ordinary requirements of the process.

In cooling the filtered gases in the pipe, 36, tarry and oily products which have passed through the screen, 28, are condensed, together with any finely divided carbon which may have been carried through the screen. The condensed products will vary somewhat under different conditions of operation, but usually comprise a variety of hydrocarbons, consisting largely of naphthaline and other hydrocarbons of the aromatic series. These products are usually produced in the form of a fine mist or suspension of droplets carried in the cooled gases, from which they are filtered in the filtering chamber, 40.

From the end of the pipe, 36, the gases enter a compartment, 52, formed in the lower part of the filtering chamber, 40, by means of a horizontal partition, 54. The gases pass upwardly from the compartment 52, through openings, 56, in the partition, 54, and enter filtering bags, 58, of suitable filtering cloth having open ends mounted in the openings, 56, and upper ends supported in an upper compartment, 60, of the chamber, 40, into which the gases pass through the filter bags. The tarry products are retained on the inner surface of the bags and the gases passing into the chamber, 50, are removed through an outlet pipe, 52, by means of a fan, 64. The bags, 56, are shaken at intervals to cause the filtered carbon and tarry products to drop into a hopper, 56, in the lower part of the compartment, 52, from which they may be removed through a chute, 66, upon the removal of a slide, 70. To enable the bags to be shaken, the upper ends of the bags are supported by means of blocks, 72, suspended from a frame, 74, which is, in turn, carried by a rod, 76, passing through and mounted eccentrically in the upper part of the chamber and provided with a crank, 78, outside of the chamber.

The preferred embodiment of the invention has been described in the above specification but it will be understood that various changes in the form and proportions of the filtering screen and in the form and arrangement of the various elements of the invention without departing from the broader features of the invention, set forth in the following claims.

Having described the invention, what is claimed as new is:

1. A process of producing and recovering carbon black which comprises, incompletely oxidizing hydrocarbons to form carbon, continuously filtering the products of partial oxidation through a screen, continuously passing said screen through said gases and continuously removing carbon from said screen out of contact with said gases.

2. A process of producing and recovering carbon black which comprises, incompletely oxidizing hydrocarbons to form a suspension of carbon in gaseous products of combustion, passing the gaseous products of said partial combustion in a continuous stream through a filter, continuously renewing said filter and removing deposited carbon from said filter out of contact with said gases.

3. A process of producing and recovering carbon black, which comprises incompletely oxidizing hydrocarbon gases to form carbon, continuously passing the products of said partial oxidation through a filter and continuously passing said filter in a continuous manner through said products of partial oxidation to carry filtered carbon out of said gaseous products.

4. A process of producing carbon black which comprises, dissociating and incompletely oxidizing hydrocarbons to form a suspension of carbon in gaseous products of said oxidation, continuously separating said carbon from said gaseous products at a temperature over that approximating that of the ignition points of said hydrocarbons, and removing said separated carbon from contact with said gaseous products.

5. A process of producing carbon black which comprises, dissociating and incompletely oxidizing hydrocarbons to form free carbon suspended in gaseous reaction products, continuously filtering said carbon from said gaseous products at a temperature of over 800° F. and continuously removing said filtered carbon from contact with said gaseous products.

6. A process of producing carbon black which comprises, treating hydrocarbons to produce a suspension of finely divided free carbon in gaseous products of said treatment, separating said carbon from said gaseous products at temperatures above which substantial amounts of oils or tar are deposited in said separated carbon and continuously removing said carbon from contact with said gases at said temperatures.

7. A process of producing carbon black which comprises, treating hydrocarbons in a gaseous state to produce a suspension of finely divided carbon in the gaseous products of said treatment, separating said carbon from said gaseous products in a continuous manner and continuously removing said separated carbon from contact with said gases while maintaining said carbon and said gases at a temperature above which tarry and oily products are deposited in said carbon.

8. A process of producing carbon black which comprises partially oxidizing hydrocarbons to form a suspension of carbon in the gaseous products of reaction, continuously passing said gaseous products through a filtering screen, moving said screen transversely of said gaseous products of oxidation to remove filtered carbon from contact with said gaseous products and to continuously present a new filtering surface to said gases.

9. A process of producing carbon black which comprises, partially oxidizing hydrocarbons in a closed furnace to form a suspension of carbon in gaseous products of partial combustion, removing said gases and carbon from said furnace, filtering the carbon from the gaseous products of combustion without substantial cooling of said gases or carbon and continuously removing said carbon from said gases.

10. An apparatus for the production and recovery of carbon black which comprises a furnace, a rotating screen of heat resisting material, means for drawing gases from said furnace through said screen throughout a portion of its path of travel and means for removing deposits of filtered carbon from said screen while out of contact with said gases.

11. An apparatus for the production and recovery of carbon black which comprises a furnace, a rotating cylindrical filtering screen of heat resisting material, means for drawing gases from said furnace inwardly through said screen during a part of its path of travel and means for removing deposits of filtered carbon from said screen out of contact with said gases.

12. An apparatus for the production and recovery of carbon black which comprises a furnace, a rotating cylindrical screen of metal, means for drawing gases from said furnace through said screen throughout a portion of its path of travel and means for removing filtered carbon from said screen out of contact with said gases.

13. An apparatus for the production and recovery of carbon black which comprises a furnace, a rotating screen of heat resisting material, means for continuously rotating said screen, means for filtering gases from said furnace through said screen during a part of its path of rotation and means for blowing carbon from said screen while out of contact with said gases.

14. An apparatus for producing and recovering carbon black which comprises a furnace arranged to partially oxidize hydrocarbons and produce suspended carbon in the gaseous products of combustion, a housing adjacent said furnace, a rotating screen of heat resisting material in said housing, an outlet leading from said furnace and arranged to pass gases from said furnace through said screen throughout a portion of its path of rotation and means for removing carbon from said screen outside of said portion of its path of travel.

15. An apparatus for producing carbon black, which comprises a furnace, a housing adjacent said furnace, a rotating cylindrical screen in said housing, an outlet from said furnace leading to the outer surface of said screen, a chamber within said screen and open to the portion of said screen opposite said furnace outlet and means for withdrawing gases from said furnace through said outlet and screen and into said chamber.

16. An apparatus for the reduction and recovery of carbon black which comprises a furnace, a rotating metallic screen, means for drawing gases from said furnace through said screen and means for removing filtered carbon from said screen while out of contact with said gases.

17. An apparatus of the class described comprising a furnace, a rotating screen located in the path of travel of gases of said furnace, a carbon black recovery receptacle located outside the path of travel of said gases, and means to move the screen in the path of travel of said gases to said receptacle outside said path of travel and deposit the collected carbon therein.

In testimony whereof, I affix my signature.

CHAUNCEY MATLOCK.